United States Patent
Otsuki et al.

(10) Patent No.: US 11,594,730 B2
(45) Date of Patent: Feb. 28, 2023

(54) ELECTRODE AND LITHIUM ION SECONDARY BATTERY

(71) Applicant: TDK CORPORATION, Tokyo (JP)

(72) Inventors: Keitaro Otsuki, Tokyo (JP); Akinobu Nojima, Tokyo (JP); Tomohiko Hasegawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 127 days.

(21) Appl. No.: 17/211,959

(22) Filed: Mar. 25, 2021

(65) Prior Publication Data

US 2021/0305563 A1    Sep. 30, 2021

(30) Foreign Application Priority Data

Mar. 30, 2020 (JP) .............................. JP2020-059287
Jan. 29, 2021 (JP) .............................. JP2021-013593

(51) Int. Cl.
| | | |
|---|---|---|
| *H01M 4/525* | (2010.01) | |
| *H01M 10/0525* | (2010.01) | |
| *H01M 4/505* | (2010.01) | |
| *H01M 4/36* | (2006.01) | |
| *H01M 4/02* | (2006.01) | |

(52) U.S. Cl.
CPC ........... *H01M 4/525* (2013.01); *H01M 4/366* (2013.01); *H01M 4/505* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | |
|---|---|---|
| 2003/0013017 A1 | 1/2003 | Nagayama et al. |
| 2004/0157124 A1 | 8/2004 | Goh et al. |
| 2004/0229123 A1 | 11/2004 | Takahashi et al. |
| 2005/0118496 A1 | 6/2005 | Chang et al. |
| 2005/0260495 A1 | 11/2005 | Onnerud et al. |
| 2006/0093549 A1 | 5/2006 | Takahashi et al. |
| 2009/0011336 A1 | 1/2009 | Inoue et al. |
| 2010/0203386 A1 | 8/2010 | Chang et al. |
| 2014/0315078 A1 | 10/2014 | Chang et al. |
| 2019/0296349 A1* | 9/2019 | Cho ........................ H01M 4/62 |

FOREIGN PATENT DOCUMENTS

| | | |
|---|---|---|
| JP | H08-236114 A | 9/1996 |
| JP | H11-016566 A | 1/1999 |
| JP | 2002-110156 A | 4/2002 |
| JP | 2005-123111 A | 5/2005 |
| WO | 02/054511 A1 | 7/2002 |
| WO | 2005/031892 A2 | 4/2005 |

\* cited by examiner

*Primary Examiner* — Wyatt P McConnell
(74) *Attorney, Agent, or Firm* — Oliff PLC

(57) ABSTRACT

An electrode and a lithium ion secondary battery having excellent cycle characteristics in a high temperature environment are provided. An electrode includes: an active material layer including an active material, a conductive assistant, and a binder, wherein the active material contains active material particles containing a lithium transition metal oxide as a main component, and the active material particles each include a core part having a space group of R-3m and a covering part having a space group of Fm-3m configured to cover at least part of an outer circumferential portion of the core part.

5 Claims, 2 Drawing Sheets

ELECTRODE AND LITHIUM ION SECONDARY BATTERY

CROSS-REFERENCE TO RELATED APPLICATION

Priority is claimed on Japanese Patent Application No. 2020-059287, filed Mar. 30, 2020, and Japanese Patent Application No. 2021-013593, filed Jan. 29, 2021, the content of which is incorporated herein by reference.

BACKGROUND OF THE DISCLOSURE

Field of the Disclosure

The present disclosure relates to an electrode and a lithium ion secondary battery.

Description of Related Art

In recent years, as household appliances have become more portable and cordless, non-aqueous electrolyte secondary batteries have been put into practical use as power sources for small electronic devices such as laptop computers, mobile phones, and video cameras. With regard to such non-aqueous electrolyte secondary batteries, research and development concerning lithium cobalt oxide ($LiCoO_2$) is being actively promoted and many proposals regarding this have been provided so far.

For example, among lithium secondary batteries including a positive electrode containing a lithium-transition metal composite oxide as an active material, a lithium secondary battery having a coating film made of BeO, MgO, CaO, SrO, BaO, ZnO, $Al_2O_3$, $CeO_2$, $As_2O_3$, or a mixture of two or more thereof formed on a surface of the positive electrode has been proposed (for example, refer to Patent Document 1).

Also, among batteries which include a negative electrode, a positive electrode, and a non-aqueous electrolyte including a lithium salt and can be reversibly charged and discharged multiple times, a positive electrode in which a metal including at least one selected from Ti, Al, Sn, Bi, Cu, Si, Ga, W, Zr, B, and Mo and/or, an intermetallic compound obtained as a combination of a plurality of these elements, and/or an oxide is applied around the positive electrode and a battery in which the positive electrode is utilized have been proposed (for example, refer to Patent Document 2).

PATENT DOCUMENTS

[Patent Document 1] Japanese Unexamined Patent Application, First Publication No. 1996-236114
[Patent Document 2] Japanese Unexamined Patent Application, First Publication No. 1999-16566

SUMMARY OF THE DISCLOSURE

It is desirable that secondary batteries used as power sources for small electronic devices have a small decrease in capacity when charging and discharging are repeatedly performed under various usage environments, that is, have exceptional cycle characteristics. However, lithium ion secondary batteries tend to have poor cycle characteristics in a high temperature environment such as in an automobile in summer.

The present disclosure was made in view of the above problems, and an object of the present disclosure is to provide an electrode and a lithium ion secondary battery having exceptional cycle characteristics in a high temperature environment.

The inventors of the present disclosure found that cycle characteristics in a high temperature environment are improved using active material particles with a constitution in which a lithium transition metal oxide in which a space group is R-3m is used as a core part and an outer circumferential portion of the core part is covered with a covering part in which a space group is Fm-3m.

Therefore, in order to achieve the above object, the following means are provided.

[1] An electrode according to a first aspect includes: an active material layer including an active material, a conductive assistant, and a binder, wherein the active material contains active material particles containing a lithium transition metal oxide as a main component, and the active material particles each include a core part having a space group of R-3m and a covering part having a space group of Fm-3m configured to cover at least a part of an outer circumferential portion of the core part.

[2] In the electrode according to the first aspect, in the active material particle, the core part may contain a compound represented by the following general formula (1) and the covering part may contain a compound represented by the following general formula (2): $Li_aM1O_2$ (1), where M1 in the general formula (1) represents at least one transition metal selected from the group consisting of Co, Ni, and Mn and a represents a number in which $0 \le a \le 1.2$ is satisfied, and $Li_{1-x}M2_yO_z$ (2), M2 in the general formula (2) represents at least one transition metal selected from the group consisting of Co, Ni, and Mn and x, y, and z in the general formula (2) are numbers in which $0.5 \le x \le 1$, $1 \le y \le 2$, and $1 \le z \le 3$ are satisfied.

[3] In the electrode according to the first aspect, the compound represented by the general formula (1) and the compound represented by the general formula (2) may contain at least one transition metal which is common to both.

[4] In the electrode according to the first aspect, the thickness of the covering part may be within 0.1 μm or more and 1.5 μm or less.

[5] In the electrode according to the first aspect, the compound represented by the general formula (1) may be the lithium composite metal oxide containing Co.

[6] A lithium ion secondary battery according to a second aspect includes: the electrode according to the above aspects.

The electrode and the lithium ion secondary battery according to the above aspect have excellent cycle characteristics in a high temperature environment.

DETAILED DESCRIPTION OF THE DISCLOSURE

Figure 1:
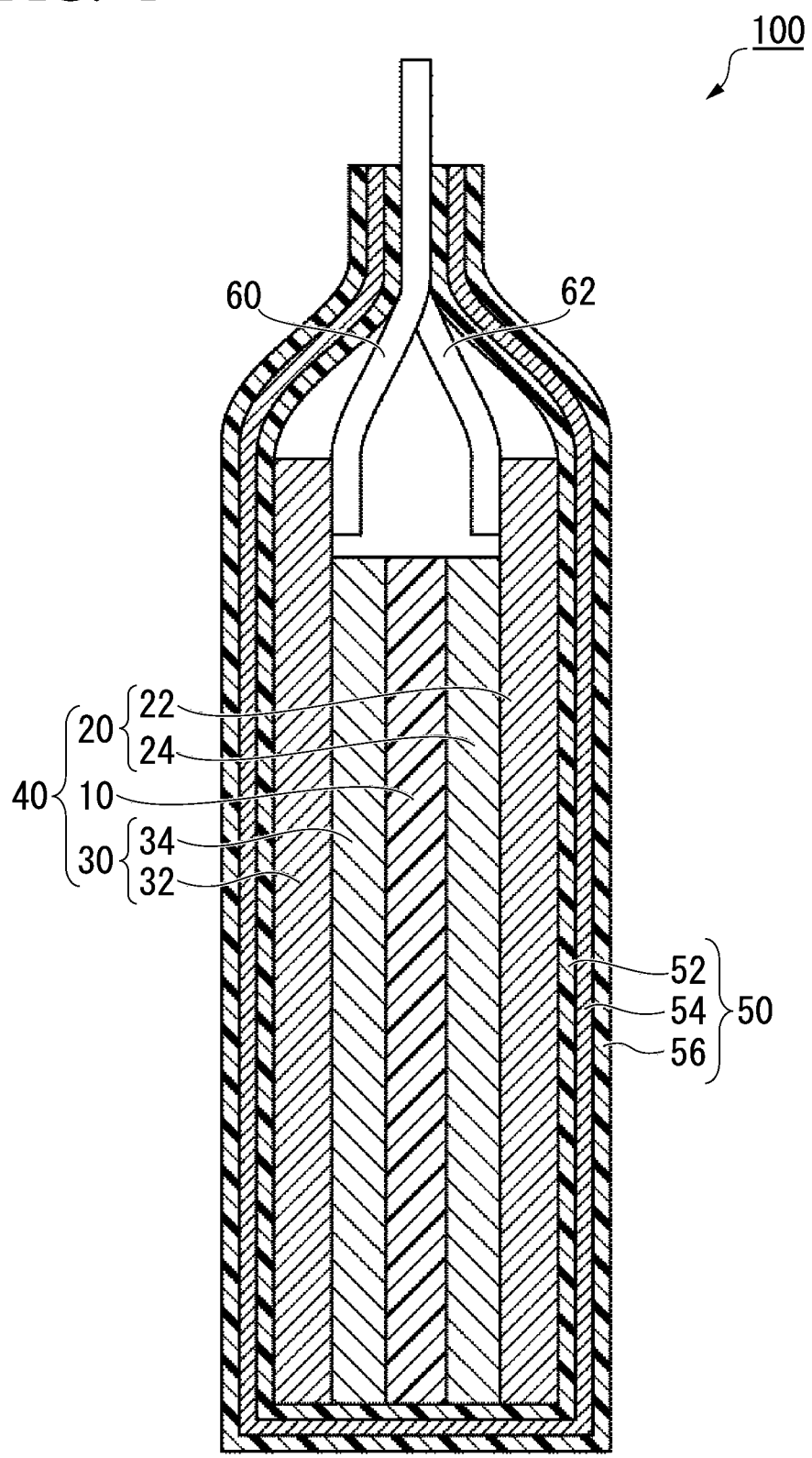
FIG. 1 is a schematic diagram of a lithium ion secondary battery according to an embodiment.

An embodiment will be described in detail below with reference to the drawings as appropriate. In the drawings used in the following description, enlarged characteristic parts may be illustrated for the sake of easily understanding the features for convenience in some cases and the dimensional ratios of the constituent elements may differ from those of the actual constituent elements in some cases. The materials, the dimensions, the numbers, the numeral values, the shapes, and the like exemplified in the following description are examples, the present disclosure is not limited thereto, and it is possible to carry out modifications as appropriate within a range in which the effects of the present disclosure are exhibited.

"Lithium Ion Secondary Battery"

FIG. 1 is a schematic diagram of a lithium ion secondary battery according to an embodiment. A lithium ion secondary battery 100 illustrated in FIG. 1 includes a power generation element 40, an exterior body 50, and a nonaqueous electrolytic solution (not shown). The exterior body 50 covers the periphery of the power generation element 40. The power generation element 40 is connected to the outside using a pair of connected terminals 60 and 62. The nonaqueous electrolytic solution is accommodated in the exterior body 50.

(Power Generation Element)

The power generation element 40 includes a positive electrode 20, a negative electrode 30, and a separator 10.

<Separator>

The separator 10 is arranged between the positive electrode 20 and the negative electrode 30. The separator 10 isolates the positive electrode 20 from the negative electrode 30 and prevents a short circuit between the positive electrode 20 and the negative electrode 30. Lithium ions can pass through the separator 10.

The separator 10 has, for example, an electrically insulating porous structure. Examples of the separator 10 include a monolayer or a laminated body formed of a film made of polyolefin such as polyethylene or polypropylene, and a stretched film formed of a mixture having the above resins, or a fiber non-woven fabric made of at least one constituent material selected from the group consisting of cellulose, polyesters, polyacrylonitriles, polyamides, polyethylenes, and polypropylenes.

The separator 10 may be made of a solid electrolyte. Examples of the solid electrolyte include polymer solid electrolytes, oxide-based solid electrolytes, and sulfide-based solid electrolytes. Examples of the polymer solid electrolyte include electrolytes obtained by dissolving alkali metal salts in polyethylene oxide-based polymers. Examples of the oxide-based solid electrolyte include $Li_{1.3}Al_{0.3}Ti_{1.7}(PO_4)_3$ (a nasicon type), $Li_{1.07}Al_{0.69}Ti_{1.46}(PO_4)_3$ (a glass ceramic), $Li_{0.34}La_{0.51}TiO_{2.94}$ (a perovskite type), $Li_7La_3Zr_2O_{12}$ (a garnet type), $Li_{2.9}PO_{3.3}N_{0.46}$ (amorphous; LIPON), $50Li_4SiO_4\cdot50Li_2BO_3$ (a glass), and $90Li_3BO_3\cdot10Li_2SO_4$ (a glass ceramic). Examples of the sulfide-based solid electrolyte include $Li_{3.25}Ge_{0.25}P_{0.75}S_4$ (a crystal), $Li_{10}GeP_2S_{12}$ (crystal; LGPS), $Li_6PS_5Cl$ (crystal; an argyrodite type), $Li_{9.54}Si_{1.74}P_{1.44}S_{11.7}Cl_{0.3}$ (crystal), $Li_{3.25}P_{0.95}S_4$ (glass ceramics), $Li_7P_3S_{11}$ (glass ceramics), $70Li_2S\cdot30P_2S_5$ (glass), $30Li_2S\cdot26B_2S_3\cdot44LiI$ (glass), $50Li_2S\cdot17P_2S_5\cdot33LiBH_4$ (glass), $63Li_2S\cdot36SiS_2\cdot Li_3PO_4$ (glass), and $57Li_2S\cdot38SiS_2\cdot5Li_4SiO_4$ (glass).

<Positive Electrode>

The positive electrode 20 includes a positive electrode current collector 22 and a positive electrode active material layer 24. The positive electrode active material layer 24 is provided on at least one surface of the positive electrode current collector 22.

[Positive Electrode Current Collector]

The positive electrode current collector 22 is made of, for example, a conductive plate material. The positive electrode current collector 22 is formed of, for example, a thin metal plate made of aluminum, copper, nickel, titanium, stainless steel, or the like.

[Positive Electrode Active Material Layer]

The positive electrode active material layer 24 includes, for example, a positive electrode active material, a conductive assistant, and a binder.

The positive electrode active material includes positive electrode active material particles containing a lithium transition metal oxide as a main component.

Figure 2:
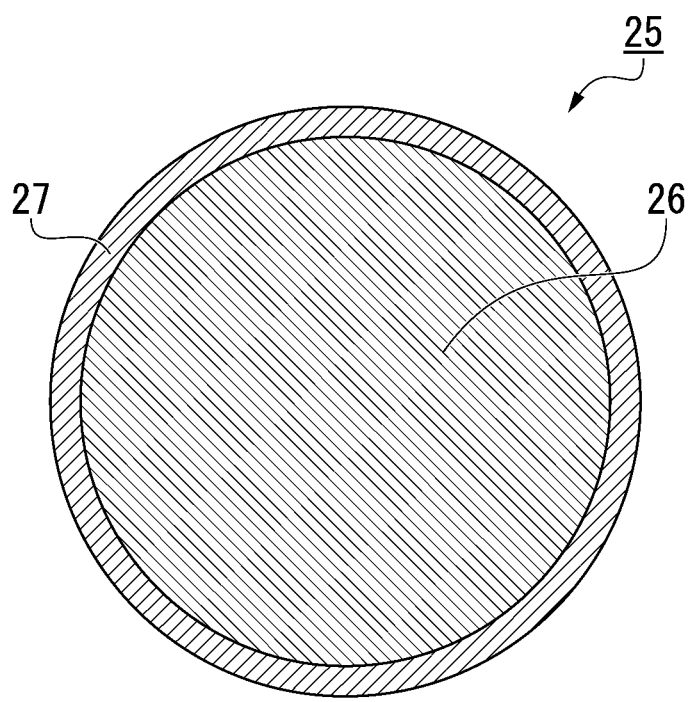
FIG. 2 is a cross-sectional view of an example of active material particles used for a positive electrode of the lithium ion secondary battery according to the embodiment.

FIG. 2 is a cross-sectional view of an example of active material particles used for the positive electrode of the lithium ion secondary battery according to the embodiment. As illustrated in FIG. 2, each positive electrode active material particle 25 has a core part 26 and a covering part 27 configured to cover at least part of an outer circumferential portion of the core part 26.

The core part 26 is a part in which lithium ions are reversibly deintercalated and intercalated and which acts with an active material. The core part 26 has a space group of R-3m. The core part 26 contains a compound represented by the following general formula (1):

$$Li_aM1O_2 \quad (1);$$

in general formula (1), M represents at least one transition metal selected from the group consisting of Co, Ni, and Mn and a represents a number in which $0 \le a \le 1.2$ is satisfied.

Examples of the compound represented by general formula (1) include lithium transition metal oxides such as lithium cobalt oxides ($Li_aCoO_2$, hereinafter also referred to as "LCO"), lithium nickel oxides ($Li_aNiO_2$), lithium manganese oxides ($Li_aMnO_2$), and lithium composite metal oxides represented by $Li_aNi_xCo_yMn_zO_2$ ($x+y+z=1$; $0 \le x < 1$; $0 \le y < 1$; and $0 \le z < 1$). The lithium composite metal oxides may be ternary lithium composite metal oxides (hereinafter also referred to as "NCM or NMC") containing Ni, Co, or Mn.

The covering part 27 has a space group of Fm-3m. The covering part 27 contains a compound represented by the following general formula (2):

$$Li_{1-x}M2_yO_z \quad (2);$$

in general formula (2), M2 represents at least one transition metal selected from the group consisting of Co, Ni, and Mn and x, y, and z represent numbers in which $0.5 \le x \le 1$; $1 \le y \le 2$; and $1 \le z \le 3$ are satisfied.

As the compound represented by general formula (2), an oxide containing two or more of a cobalt oxide, a nickel oxide, a manganese oxide, cobalt, nickel, and manganese can be used. Furthermore, lithium composite metal oxides in which lithium is omitted and which have a space group of Fm-3m can be used.

A compound forming the core part 26 and a compound forming the covering part 27 may contain at least one transition metal which is common to the two. For example, when the core part 26 contains LCO, it is desirable that the covering part 27 contain a cobalt oxide, an oxide containing cobalt and at least one of nickel and manganese, a lithium cobalt oxide, or a lithium composite metal oxide which contains cobalt and in which lithium is partly omitted therefrom.

It can be confirmed using an electron diffraction method that the space group of the core part 26 is R-3m and the space group of the covering part 27 is Fm-3m. The electron diffraction method is a method in which a crystal structure of a sample is obtained from a diffraction pattern obtained by irradiating the sample with an electron beam.

An average particle size of the core part 26 of the positive electrode active material particle 25 may be within a range of 5 μm or more and 15 μm or less. A thickness of the covering part 27 may be within a range of 0.1 μm or more and 1.5 μm or less. The thickness of the covering part 27 may be within a range of 0.2 μm or more and 1.0 μm or less.

Although the entire core part 26 is covered with the covering part 27 in the positive electrode active material particle 25 illustrated in FIG. 2, the covering part 27 does not necessarily need to cover the entire core part 26. The covering part 27 may cover at least part of the core part 26. Here, the covering part 27 may cover 50% or more of a surface of the core part 26.

As a method for forming the covering part 27 of the positive electrode active material particle 25, for example, a mechanical milling method can be utilized. The mechanical milling method is a method for depositing covering material fine particles on a surface of an active material substance particle by pulverizing and mixing active material substance particles which is a material of the core part 26 and covering material fine particles which is a material of the covering part 27. Furthermore, as a method for forming the covering part 27, a thin film forming method such as a physical vapor deposition (PVD), a chemical vapor deposition method (CVD), or a sputtering method can be utilized. In addition, as a method for forming the covering part 27, a method for changing a space group of a surface of a lithium transition metal oxide to Fm-3m by immersing a lithium transition metal oxide having a space group of R-3m in an acetonitrile solvent in which nitronium tetrafluoroborate has been dissolved, chemically deintercalating lithium from the surface of the lithium transition metal oxide, and then heating these can be utilized.

The binder binds the positive electrode active materials in the positive electrode active material layer 24. As the binder, a known binder can be utilized. The binder may include a fluororesin. Examples of the fluororesin include polyvinylidene fluorides (PVDFs), polytetrafluoroethylenes (PTFEs), tetrafluoroethylene-hexafluoropropylene copolymers (FEPs), tetrafluoroethylene-perfluoroalkyl vinyl ether copolymers (PFAs), ethylene-tetrafluoroethylene copolymers (ETFEs), polychlorotrifluoroethylenes (PCTFEs), ethylene-chlorotrifluoroethylene copolymers (ECTFEs), polyvinyl fluorides (PVFs), and the like.

In addition to the above materials, examples of the binder include vinylidene fluoride-based fluororubbers such as vinylidene fluoride-hexafluoropropylene fluororubbers (VDF-HFP-based fluororubbers), vinylidene fluoride-hexafluoropropylene-tetrafluoroethylene-based fluororubbers (VDF-HFP-TFE-based fluororubbers), vinylidene fluoride-pentafluoropropylene-based fluororubbers (VDF-PFP-based fluororubbers), vinylidene fluoride-pentafluoropropylene-tetrafluoroethylene-based fluororubbers (VDF-PFP-TFE-based fluororubbers), vinylidene fluoride-perfluoromethyl vinyl ehter-tetrafluoroethylene-based fluororubbers (VDF-PFMVE-TFE-based fluororubbers), and vinylidene fluoride-chlorotrifluoroethylene-based fluororubbers (VDF-CTFE-based fluororubbers).

The conductive assistant improves the conductivity between the positive electrode active material particles in the positive electrode active material layer 24. Examples of the conductive assistant include carbon powders such as carbon blacks, carbon nanotubes, carbon nanotubes, carbon materials, metal powders such as copper, nickel, stainless steel, and iron, mixtures of a carbon material and a metal powder, and conductive oxides such as ITO. It is desirable that the conductive assistant be a carbon material such as a carbon black in some embodiments. When a sufficient conductivity can be secured using only an active material, the positive electrode active material layer 24 may not contain a conductive assistant.

The positive electrode active material layer 24 may contain a solid electrolyte or a gel electrolyte. The solid electrolyte is the same as that which can be used for, for example, a separator.

<Negative Electrode>

The negative electrode 30 includes, for example, a negative electrode current collector 32 and a negative electrode active material layer 34. The negative electrode active material layer 34 is formed on at least one surface of the negative electrode current collector 32.

[Negative Electrode Current Collector]

The negative electrode current collector 32 is made of, for example, a conductive plate material. As the negative electrode current collector 32, a current collector that is the same as the positive electrode current collector 22 can be utilized.

[Negative Electrode Active Material Layer]

The negative electrode active material layer 34 contains a negative electrode active material. Furthermore, if necessary, the negative electrode active material layer 34 may contain a conductive assistant, a binder, and solid electrolyte.

The negative electrode active material may be any compound capable of occluding and release ions and a known negative electrode active material used for the lithium ion secondary battery can be utilized as the negative electrode active material. The negative electrode active material is, for example, particles which include metallic lithium, a lithium alloy, carbon materials such as graphite (natural graphite or artificial graphite), carbon nanotubes, non-graphitizable carbon, easily graphitized carbon, and low temperature fired carbon capable of occluding and releasing ions, a semi-metal or a metal such as aluminum, silicon, tin, and germanium which can be combined with a metal such as lithium, a non-crystalline compound mainly including an oxide such as $SiO_x$ (0<x<2) and tin dioxide, lithium titanates ($Li_4Ti_5O_{12}$), and the like.

As described above, the negative electrode active material layer 34 may contain, for example, silicon, tin, and germanium. Silicon, tin, and germanium may exist as single elements or compounds. The compounds are, for example, alloys, oxides, or the like. As an example, when the negative electrode active material is silicon, the negative electrode 30 may be referred to as a "Si negative electrode" in some cases. The negative electrode active material may be, for example, a single element such as silicon, tin, and germanium, a mixed type such as a compound, and a carbon material. The carbon material is, for example, natural graphite. Furthermore, the negative electrode active material may be, for example, obtained by covering a surface of a single element such as silicon, tin, and germanium or a compound with carbon. The carbon material and the covered carbon improve the conductivity between the negative electrode active material and the conductive assistant. If the negative electrode active material layer contains silicon, tin, and germanium, the capacity of the lithium ion secondary battery 100 increases.

As described above, the negative electrode active material layer 34 may contain, for example, lithium. Lithium may be metallic lithium or a lithium alloy. The negative electrode active material layer 34 may be metallic lithium or a lithium alloy. The lithium alloy is, for example, an alloy of one or more elements selected from the group consisting of Si, Sn, C, Pt, Ir, Ni, Cu, Ti, Na, K, Rb, Cs, Fr, Be, Mg, Ca, Sr, Sb, Pb, In, Zn, Ba, Ra, Ge, and Al and lithium. As an example, when the negative electrode active material is metallic lithium, the negative electrode 30 may be referred to as a "Li negative electrode" in some cases. The negative electrode active material layer 34 may be a lithium sheet.

The negative electrode 30 may be only the negative electrode current collector 32 without having the negative electrode active material layer 34 at the time of preparation. When the lithium ion secondary battery 100 is charged, metallic lithium is deposited on the surface of the negative electrode current collector 32. Metallic lithium is lithium which is a single element in which lithium ions have precipitated and metallic lithium functions as the negative electrode active material layer 34.

As the conductive assistant and the binder, a conductive material and a binder that are the same as those of the positive electrode 20 can be utilized. The binder in the negative electrode 30 may be, for example, cellulose, styrene/butadiene rubbers, ethylene/propylene rubbers, polyimide resins, polyamide-imide resins, acrylic resins, or the like, in addition to those exemplified in the positive electrode 20. Cellulose may be, for example, carboxymethyl cellulose (CMC).

(Terminal)

The terminals 60 and 62 are connected to the positive electrode 20 and the negative electrode 30, respectively. The terminal 60 connected to the positive electrode 20 is a positive electrode terminal and the terminal 62 connected to the negative electrode 30 is a negative electrode terminal. The terminals 60 and 62 are responsible for electrical connection to the outside. The terminals 60 and 62 are formed of a conductive material such as aluminum, nickel, or copper. A connection method may be welding or screwing. It is desirable to protect the terminals 60 and 62 with an insulating tape to prevent a short circuit.

(Exterior Body)

The exterior body 50 seals the power generation element 40 and the non-aqueous electrolytic solution therein. The exterior body 50 suppresses leakage of the non-aqueous electrolytic solution to the outside and entering of moisture or the like from the outside into the lithium ion secondary battery 100.

As illustrated in FIG. 1, the exterior body 50, for example, includes a metal foil 52 and resin layers 54 laminated on surfaces of the metal foil 52. The exterior body 50 is a metal laminate film obtained by coating the metal foil 52 with a polymer film (the resin layer 54) from both sides.

As the metal foil 52, for example, an aluminum foil can be utilized. A polymer film such as polypropylene can be used for the resin layer 54. Materials constituting the resin layer 54 may differ between the inner side and the outer side. For example, as the material for the outer side, for example, a polymer having a high melting, polyethylene terephthalate (PET), polyamide (PA), or the like can be used, and as the material for the inner polymer film, polyethylene (PE), polypropylene (PP), or the like can be used.

(Non-Aqueous Electrolytic Solution)

The non-aqueous electrolytic solution is sealed in the exterior body 50 and impregnated in the power generation element 40.

The non-aqueous electrolytic solution has, for example, a non-aqueous solvent and an electrolyte. The electrolyte is dissolved in the non-aqueous solvent.

The non-aqueous solvent contains, for example, a cyclic carbonate and a chain carbonate. The cyclic carbonate solvates the electrolyte. Examples of the cyclic carbonate include ethylene carbonate, propylene carbonate, and butylene carbonate. The chain carbonate reduces the viscosity of the cyclic carbonate. Examples of the chain carbonate include diethyl carbonate, dimethyl carbonate, and ethyl methyl carbonate. The non-aqueous solvent may also include methyl acetate, ethyl acetate, methyl propionate, ethyl propionate, propyl propionate, γ-butyrolactone, 1,2-dimethoxyethane, 1, 2-diethoxyethane, or the like.

In the cyclic carbonate or the chain carbonate, some hydrogen may be replaced with fluorine. For example, fluoroethylene carbonate, difluoroethylene carbonate, or the like may be utilized.

A ratio of the cyclic carbonate to the chain carbonate in the non-aqueous solvent may be 1:9 to 1:1 in volume.

The electrolyte is, for example, a lithium salt. Examples of the electrolyte include $LiPF_6$, $LiClO_4$, $LiBF_4$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, LiBOB, and the like. One type of a lithium salt may be used independently or a combination of two or more types thereof may be used. From the viewpoint of a degree of ionization, it is desirable that the electrolyte contain $LiPF_6$ in some embodiments.

The non-aqueous solvent may include, for example, a room temperature molten salt. The room temperature molten salt is a salt obtained through a combination of a cation and an anion and is in a liquid state even at a temperature lower than 100° C. Since the room temperature molten salt is a liquid consisting of only ions, the room temperature molten salt has strong electrostatic interactions and is characterized by being non-volatile and non-flammable.

Examples of a cation component of the room temperature molten salt include nitrogen-based cations containing nitrogen, phosphorus-based cations containing phosphorus, sulfur-based cations containing sulfur, and the like. These cation components may contain one type independently or a combination of two or more types.

Examples of the nitrogen-based cations include chain- or cyclic-ammonium cations such as imidazolium cations, pyrrolidinium cations, piperidinium cations, pyridinium cations, and azoniaspiro cation.

Examples of the phosphorus-based cations include chain- or cyclic-phosphonium cations.

Examples of the sulfur-based cations include chain- or cyclic-sulfonium cations.

As the cation components, particularly, N-methyl-N-propyl-pyrrolidinium (P13) which is a nitrogen-based cation is preferable in some embodiments because it has high lithium ion conduction and wide redox resistance when a lithium imide salt is dissolved.

Examples of an anion component of the room temperature molten salt include $AlCl_4^-$, $NO_2^-$, $NO_3^-$, $I^-$, $BF_4^-$, $PF_6^-$, $AsF_6^-$, $SbF_6^-$, $NbF_6^-$, $TaF_6^-$, $F(HF)_{2.3}^-$, $p\text{-}CH_3PhSO_3^-$, $CH_3CO_2^-$, $CF_3CO_2^-$, $CH_3SO_3^-$, $CF_3SO_3^-$, $(CF_3SO_2)_3C^-$, $C_3F_7CO_2^-$, $C_4F_9SO_3^-$, $(FSO_2)_2N^-$ (bis(fluorosulfonyl)imide) (FSI), $(CF_3SO_2)_2^-$ (bis(trifluoromethanesulfonyl)imide) (TFSI), $(C_2F_5SO_2)_2N^-$ (bis(pentafluoroethanesulfonyl)imide), $(CF_3SO_2)(CF_3CO)N^-$ ((trifluoromethanesulfonyl)(trifluoromethanecarbonyl)imide), $(CN)_2N^-$ (dicyanoimide), and the like. These anion components may contain one type independently or a combination of two or more types.

"Method for Manufacturing Lithium Ion Secondary Battery"

First, the positive electrode 20 is prepared. In the positive electrode 20, a paste-like positive electrode slurry is prepared by mixing the positive electrode active material, the binder, and the solvent. A method for mixing these components constituting the positive electrode slurry is not particularly limited and a mixing order is also not particularly limited. Subsequently, the positive electrode current collector 22 is coated with the positive electrode slurry. A coating method is not particularly limited. For example, a slit die coat method and a doctor blade method can be exemplified.

Subsequently, the solvent in the positive electrode slurry applied above the positive electrode current collector 22 is removed. A removal method is not particularly limited. For example, the positive electrode current collector 22 coated with the positive electrode slurry is dried in an atmosphere of 80° C. to 150° C. Subsequently, the positive electrode 20 is obtained by pressing the obtained coating film to increase the density of the positive electrode active material layer 24. As a pressing means, for example, a roll press machine, a hydrostatic press machine, or the like can be utilized.

Subsequently, the negative electrode 30 is prepared. The negative electrode 30 can be prepared in the same manner as in the positive electrode 20. In the negative electrode 30, a paste-like negative electrode slurry is prepared by mixing the negative electrode active material, the binder, and the solvent. The negative electrode 30 is obtained by coating the negative electrode current collector 32 with the negative electrode slurry and drying it. When the negative electrode active material is metallic lithium, a lithium foil may be attached to the negative electrode current collector 32.

Subsequently, the power generation element 40 is prepared by laminating the separator 10 so that the separator 10 is located between the prepared positive electrode 20 and negative electrode 30. When the power generation element 40 is a wound body, the positive electrode 20, the negative electrode 30, and the separator 10 are wound using one end side thereof as an axis.

Finally, the power generation element 40 is sealed in the exterior body 50. The non-aqueous electrolytic solution is injected into the exterior body 50. The non-aqueous electrolytic solution is impregnated in the power generation element 40 by injecting the non-aqueous electrolytic solution and then reducing the pressure, performing heating, or the like. The lithium ion secondary battery 100 is obtained by applying heat or the like to seal the exterior body 50.

In the lithium ion secondary battery 100 according to the embodiment, the positive electrode active material particle 25 included in the positive electrode active material includes the core part 26 having a space group of R-3m and the covering part 27 having a space group of Fm-3m which covers at least part of the outer circumferential portion of the core part 26. The core part 26 having a space group of R-3m reversibly deinterlates and interlates lithium ions and is exceptional as an active material. On the other hand, the covering part 27 having a space group of Fm-3m is chemically inactive and does not easily decompose an electrolytic solution. Furthermore, since the space group of R-3m and the space group of Fm-3m have a similar crystal structure regularity, crystal distortion and crystal defects do not easily occur at an interface between the core part 26 and the covering part 27 and the continuity of the crystal structure of each of the core part 26 and the covering part 27 is excellent. For this reason, in the positive electrode active material particle 25, the core part 26 and the covering part 27 are not easily peeled off even in a high temperature environment and the electrolytic solution does not easily decompose even if the core part 26 deintercalates and intercalates lithium ions. Thus, the lithium ion secondary battery 100 according to the embodiment has improved cycle characteristics for a long period of time even in a high temperature environment. This effect is particularly easily obtained when the thickness of the covering part 27 is within a prescribed range.

Also, in the lithium ion secondary battery 100 in the embodiment, when the core part 26 contains the compound represented by the foregoing general formula (1) and the covering part 27 contains the compound represented by the foregoing general formula (2), the chemical structures of the core part 26 and the covering part 27 are closer to each other. Thus, the affinity between the core part 26 and the covering part 27 increases. For this reason, in the positive electrode active material particle 25, the core part 26 and the covering part 27 are more difficult to peel off from each other and the electrolytic solution is more difficult to decompose even in a high temperature environment. Therefore, the lithium ion secondary battery 100 has improved cycle characteristics for a longer period of time even in a high temperature environment.

Furthermore, the lithium ion secondary battery 100 in the embodiment described above has further improved affinity between the core part 26 and the covering part 27 when the compound represented by the foregoing general formula (1) and the compound represented by the foregoing general formula (2) contain at least one transition metal which is the same as each other. For this reason, the core part 26 and the covering part 27 are more difficult to peel off and the electrolytic solution is more difficult to decompose. Thus, the lithium ion secondary battery 100 has improved cycle characteristics for a longer period of time even in a high temperature environment.

Although the embodiments of the present disclosure have been described in detail above with reference to the drawings, the constitutions, a combination thereof, and the like in the embodiment are examples and additions, omissions, replacements, and other changes of the constitution are possible without departing from the gist of the present disclosure.

For example, although the active material particles are utilized as the positive electrode active material in the embodiment, the present disclosure is not limited thereto. The active material particles can be utilized for both of the positive electrode and the negative electrode.

EXAMPLE

In this example, the following covering materials were prepared.

(1) $Li_{0.5}CoO_2$ Fine Powder

An LCO ($LiCoO_2$) dispersion solution was prepared by mixing an LCO powder (a crystal structure: a space group of R-3m; an average particle size: 8.0 μm) with an acetonitrile solvent having nitronium tetrafluoroborate dissolved therein and stirring these. The obtained LCO dispersion solution was filtered, washed with water, and then dried at 100° C. The obtained power was put into a ball mill and wet-grinded for 300 minutes.

When the composition of the obtained powder was analyzed, it was confirmed that the powder was a $Li_{0.5}CoO_2$ fine powder. The composition of the powder was obtained by dissolving the powder in an acid and measuring a metal component in the obtained solution using an inductively coupled plasma (ICP) emission spectroscopic analyzer. Furthermore, when an X-ray diffraction pattern of the obtained $Li_{0.5}CoO_2$ fine powder was measured, a space group was Fm-3m. In addition, when a particle size distribution of the obtained $Li_{0.5}CoO_2$ fine powder was measured using a laser diffraction/scattering type particle diameter distribution (particle size distribution) measuring device, an average particle size was 0.1 μm.

(2) $Li_{0.3}CoO_2$ Fine Powder

A $Li_{0.3}CoO_2$ fine powder was obtained in the same manner as in the preparation of the $Li_{0.5}CoO_2$ fine powder in (1) above, except that a ratio of nitronium tetrafluoroborate to the LCO ($LiCoO_2$) powder was changed. The obtained $Li_{0.3}CoO_2$ fine powder had a crystal structure having a space group of Fm-3m and an average particle size of 0.1

(3) $Li_{0.2}CoO_2$ Fine Powder

A $Li_{0.2}CoO_2$ fine powder was obtained in the same manner as in the preparation of the $Li_{0.5}CoO_2$ fine powder in (1) above, except that a ratio of nitronium tetrafluoroborate to the LCO ($LiCoO_2$) powder was changed. The obtained $Li_{0.2}CoO_2$ fine powder had a crystal structure having a space group of Fm-3m and an average particle size of 0.1 μm.

(4) $CoO_2$ Fine Powder

A $CoO_2$ fine powder was obtained in the same manner as in the preparation of the $Li_{0.5}CoO_2$ fine powder in (1) above, except that a ratio of nitronium tetrafluoroborate to the LCO ($LiCoO_2$) powder was changed. The obtained $CoO_2$ fine powder had a crystal structure having a space group of Fm-3m and an average particle size of 0.1 μm.

(5) CoO Fine Powder

A CoO dispersion solution was prepared by mixing a cobalt oxide (II) powder with water. The obtained dispersion solution was put into a ball mill and wet-grinded for 360 minutes. Subsequently, the CoO fine powder was recovered from the dispersion solution through filtration, washed with water, and then dried at 100° C. The obtained CoO fine powder had a crystal structure having a space group of Fin-3m and an average particle size of 0.1 μm.

(6) $Co_2O_3$ Fine Powder

A $Co_2O_3$ dispersion solution was prepared by mixing a cobalt oxide (III) powder with water. The obtained dispersion solution was put into a ball mill and wet-grinded for 360 minutes. Subsequently, a $Co_2O_3$ fine powder was recovered from the dispersion solution through filtration, washed with water, and then dried at 100° C. The obtained $Co_2O_3$ fine powder had a crystal structure having a space group of Fm-3m and an average particle size of 0.1 μm.

(7) NiO Fine Powder

A NiO dispersion solution was prepared by mixing a nickel oxide (II) powder with water. The obtained dispersion solution was put into a ball mill and wet-grinded for 360 minutes. Subsequently, a NiO fine powder was recovered from the dispersion solution through filtration, washed with water, and then dried at 100° C. The obtained NiO fine powder had a crystal structure having a space group of Fm-3m and an average particle size of 0.1 μm.

(8) $Ni_{0.5}Co_{0.5}O_2$ Fine Powder

A $LiNi_{0.5}Co_{0.5}O_2$ dispersion solution was prepared by mixing a $LiNi_{0.5}Co_{0.5}O_2$ powder (a crystal structure: a space group of R-3m) with an acetonitrile solvent having nitronium tetrafluoroborate dissolved therein. A ratio of the $LiNi_{0.5}Co_{0.5}O_2$ powder to nitronium tetrafluoroborate in the $LiNi_{0.5}Co_{0.5}O_2$ dispersion solution was 1.0:1.0 in terms of molar ratio. The obtained $LiNi_{0.5}Co_{0.5}O_2$ dispersion solution was filtered, washed with water, and then dried at 100° C. The obtained powder was heat-treated at 400° C. for 2 hours in an air atmosphere, and then put into a ball mill for wet-milling for 300 minutes. After the milling, a $Ni_{0.5}Co_{0.5}O_2$ fine powder was obtained by drying the pulverized powder at 100° C. The obtained dried product was the $Ni_{0.5}Co_{0.5}O_2$ fine powder. The $Ni_{0.5}Co_{0.5}O_2$ fine powder had a crystal structure having a space group of Fm-3m and an average particle size of 0.1 μm.

(9) LCO Fine Powder

An LCO dispersion solution was prepared by mixing the LCO powder used in (1) above with water. The obtained dispersion solution was put into a ball mill and wet-grinded for 300 minutes. Subsequently, an LCO fine powder was recovered from the dispersion solution through filtration, washed with water, and then dried at 100° C. The obtained LCO fine powder had a crystal structure having a space group of R-3m and an average particle size of 0.1 μm.

(10) $NCM_{333}$ Fine Powder

An $NCM_{333}$ dispersion solution was prepared by mixing a $LiNi_{1/3}Co_{1/3}Mn_{1/3}O_2$ powder (a crystal structure: a space group of R-3m) with water. The obtained dispersion solution was put into a ball mill and wet-grinded for 300 minutes. Subsequently, a solid matter was recovered from the dispersion solution through filtration, washed with water, and then dried at 100° C. The obtained dried product was the $NCM_{333}$ fine powder. The obtained $NCM_{333}$ fine powder had a crystal structure having a space group of R-3m and an average particle size of 0.1 μm.

(11) $NMC_{622}$ Fine Powder

An $NMC_{622}$ dispersion solution was prepared by mixing a $LiNi_{0.6}Co_{0.2}Mn_{0.2}O_2$ ($NMC_{622}$) powder (a crystal structure: a space group of R-3m) with water. The obtained dispersion solution was put into a ball mill and wet-grinded for 300 minutes. Subsequently, a solid matter was recovered from the dispersion solution through filtration, washed with water, and then dried at 100° C. The obtained dried product was the $NMC_{622}$ fine powder. The obtained $NMC_{622}$ fine powder had a crystal structure having a space group of R-3m and an average particle size of 0.1 μm.

(12) LFP Fine Powder

An LFP dispersion solution was prepared by mixing a lithium iron phosphate ($LiFePO_4$; LFP) powder (a crystal structure: a space group of Pnma) with water. The obtained dispersion solution was put into a ball mill and wet-grinded for 300 minutes. Subsequently, a solid matter was recovered from the dispersion solution through filtration, washed with water, and then dried at 100° C. The obtained dried product was an LFP fine powder. The obtained LFP fine powder had a crystal structure having a space group of Pnma and an average particle size of 0.6 μm.

(13) LMO Fine Powder

An LMO dispersion solution was prepared by mixing a $LiMn_2O_4$ (LMO) powder (a crystal structure: a space group of Fd-3m) with water. The obtained dispersion solution was put into a ball mill and wet-grinded for 300 minutes. Subsequently, a solid matter was recovered from the dispersion solution through filtration, washed with water, and then dried at 100° C. The obtained dried product was an LMO fine powder. The obtained LMO fine powder had a crystal structure having a space group of R-3m and an average particle size of 0.1 μm.

Example 1

(Preparation of Positive Electrode Active Material)

A $LiCoO_2$ (LCO) powder (a crystal structure: a space group of R-3m; an average particle size: 10.5 μm) was mixed with the $Li_{0.5}CoO_2$ fine powder prepared in (1) above at a mass ratio of a ratio of 96:4. The obtained mixture was put into a ball mill and dry-pulverized and mixed. The obtained pulverized mixture was observed using a scanning electron microscope (SEM) and the crystal structures of the outer and inner parts of the particles were measured through an electron diffraction method. As a result, it was confirmed that the obtained positive electrode active material contained positive electrode active material particles having an LCO (a core part) having a space group of R-3m and $Li_{0.5}CoO_2$ (a covering part) having a space group of Fm-3m. Furthermore, the positive electrode active material particles measured using a transmission electron microscope (TEM) had an average particle size of 11.7 μm and a thickness of a covering part of 1.2 μm.

(Preparation of Positive Electrode)

A positive electrode mixture was prepared by mixing the positive electrode active material prepared in the above description, a conductive assistant, and a binder. The conductive assistant was a carbon black and the binder was polyvinylidene fluoride (PVDF). A mass ratio among the positive electrode active material, the conductive assistant, and the binder was 96:2:2. A positive electrode slurry was prepared by dispersing this positive electrode mixture in N-methyl-2-pyrrolidone. Furthermore, one surface an aluminum foil having a thickness of 15 μm was coated with the positive electrode slurry so that a basis weight after drying was about 10.0 mg/cm². After the coating, a positive electrode active material layer was formed on one surface of the aluminum foil by drying the positive electrode slurry at 100° C. to remove the solvent. After the drying, the other surface of the aluminum foil was coated with the positive electrode slurry so that a basis weight after drying was about 10.0 mg/cm². After the coating, the positive electrode active material layers were formed on both sides of the aluminum foil by drying the positive electrode slurry at 100° C. to remove the solvent.

(Preparation of Negative Electrode)

A negative electrode mixture was prepared by mixing the negative electrode active material, the conductive assistant, and the binder. Graphite was added as the negative electrode active material, styrene/butadien rubber (SBR) was added as the binder, and carboxymethyl cellulose (CMC) was added as a thickener. A mass ratio among the negative electrode active material, the binder, and the thickener was 95:3:2. A negative electrode slurry was prepared by dispersing the negative electrode mixture in distilled water. Furthermore, one surface of a copper foil having a thickness of 10 μm was coated with the negative electrode slurry so that a basis weight after drying was about 6.0 mg/cm². After the coating, a negative electrode active material layer was formed on one surface of the copper foil by drying the negative electrode slurry at 100° C. to remove the solvent. After the drying, the other surface of the copper foil was coated with the negative electrode slurry so that a basis weight after drying was about 6.0 mg/cm². After the coating, the negative electrode active material layers were formed on both surfaces of the copper foil by drying the negative electrode slurry at 100° C. to remove the solvent.

(Preparation of Cell)

A laminated body was prepared by punching the prepared negative electrode and positive electrode into a prescribed shape, alternately laminating the negative electrode and positive electrode with a separator made of polypropylene having a thickness of 25 μm, and laminating 9 negative electrodes and 8 positive electrodes.

An opening part was formed by inserting the laminated body into an exterior body formed of an aluminum laminate film and heat-sealing it except for one peripheral place. A non-aqueous electrolytic solution was injected into the exterior body. The non-aqueous electrolytic solution includes 1.5 mol/L of lithium hexafluorophospate ($LiPF_6$) dissolved in a solvent obtained by mixing the same amounts of ethylene carbonate (EC) and dimethyl carbonate (DEC). Furthermore, the lithium ion secondary battery according to Example 1 was prepared by sealing one place of the remaining part with a heat seal while reducing the pressure using a vacuum sealing machine.

(Evaluation of Battery: Cycle Characteristics)

The cycle characteristics of the prepared lithium ion secondary battery were evaluated in an environment of 60° C. using a secondary battery charge/discharge test device (manufactured by Hokuto Denko Co., Ltd.). The cycle characteristics were evaluated by repeatedly performing a charge/discharge cycle of 1000 cycles in which a constant current and constant voltage was changed to 4.35 V at 0.5 C and a constant current is discharged to 2.8 V at 1 C. Table 1 below shows a capacity retention rate with respect to an initial capacity and a relative capacity with respect to that of Comparative Example 1. The capacity retention rate with respect to the initial capacity is a discharge capacity at a $1000^{th}$ cycle when a discharge capacity at an initial (first) cycle is assumed as 100%. The relative capacity with respect to that of Comparative Example 1 is a relative value of a discharge capacity at a $1000^{th}$ cycle when a discharge capacity at a $1000^{th}$ cycle of the lithium ion secondary battery prepared in Comparative Example 1 which will be described later is assumed as 100.

Examples 2 to 8 and Comparative Examples 1 to 6

Examples 2 to 8 and Comparative Examples 2 to 6 are different from Example 1 in that the following materials are used as a covering material instead of the $Li_{0.5}CoO_2$ fine powder when the positive electrode active material is prepared. It was confirmed that the obtained positive electrode active material contained the positive electrode active material particles having a core part having a space group of R-3m and a covering part. In Comparative Example 1, an LCO powder was not covered with a covering material and the LCO power was used as a positive electrode active material.

In Example 2, the $Li_{0.3}CoO_2$ fine powder prepared in (2) above was used.

In Example 3, the $Li_{0.2}CoO_2$ fine powder prepared in (3) above was used.

In Example 4, the $CoO_2$ fine powder prepared in (4) above was used.

In Example 5, the $CoO$ fine powder prepared in (5) above was used.

In Example 6, the $Co_2O_3$ fine powder prepared in (6) above was used.

In Example 7, the $NiO$ fine powder prepared in (7) above was used.

In Example 8, the $Ni_{0.5}Co_{0.5}O_2$ fine powder prepared in (8) above was used.

In Comparative Example 2, the LCO fine powder prepared in (9) above was used.

In Comparative Example 3, the $NCM_{333}$ fine powder prepared in (10) above was used.

In Comparative Example 4, the $NMC_{622}$ fine powder prepared in (11) above was used.

In Comparative Example 5, the LFP fine powder prepared in (12) above was used.

In Comparative Example 6, the LMO fine powder prepared in (13) above was used.

The cycle characteristics of the lithium ion secondary batteries prepared in Examples 2 to 8 and Comparative Examples 1 to 6 were evaluated in the same manner as in Example 1. The results are shown in Table 1 below.

TABLE 1

| | Core part | | Covering part | | | Cycle characteristics | |
|---|---|---|---|---|---|---|---|
| | | | | | | Capacity retention rate with respect to initial capacity (%) | Relative capacity with respect to that of Comparative Example 1 |
| | Material | Space group | Material | Space group | Thickness (μm) | | |
| Example 1 | LCO | R-3m | $Li_{0.5}CoO_2$ | Fm-3m | 1.2 | 83 | 118.6 |
| Example 2 | LCO | R-3m | $Li_{0.3}CoO_2$ | Fm-3m | 1.2 | 85 | 121.4 |
| Example 3 | LCO | R-3m | $Li_{0.2}CoO_2$ | Fm-3m | 1.2 | 83 | 118.6 |
| Example 4 | LCO | R-3m | $CoO_2$ | Fm-3m | 1.2 | 84 | 120.0 |
| Example 5 | LCO | R-3m | CoO | Fm-3m | 1.2 | 81 | 115.7 |
| Example 6 | LCO | R-3m | $Co_2O_3$ | Fm-3m | 1.2 | 82 | 117.1 |
| Example 7 | LCO | R-3m | NiO | Fm-3m | 1.2 | 75 | 107.1 |
| Example 8 | LCO | R-3m | $Ni_{0.5}Co_{0.5}O_2$ | Fm-3m | 1.2 | 81 | 115.7 |
| Comparative Example 1 | LCO | R-3m | — | — | — | 70 | 100 |
| Comparative Example 2 | LCO | R-3m | LCO | R-3m | 1.2 | 69 | 98.6 |
| Comparative Example 3 | LCO | R-3m | $NCM_{333}$ | R-3m | 1.2 | 71 | 101.4 |
| Comparative Example 4 | LCO | R-3m | $NMC_{622}$ | R-3m | 1.2 | 68 | 97.1 |
| Comparative Example 5 | LCO | R-3m | LFP | Pnma | 1.2 | 69 | 98.6 |
| Comparative Example 6 | LCO | R-3m | LMO | Fd-3m | 1.2 | 67 | 95.7 |

It was confirmed in Examples 1 to 8 in which the core part of each of the positive electrode active material particles was the LCO having a space group of R-3m and the covering part was the compound having a space group of Fm-3m that the capacity retention rate with respect to the initial capacity and the relative capacity with respect to that of Comparative Example 1 were improved. Furthermore, it was confirmed in Examples 1 to 6 and 8 in which the compound containing Co was used in the covering part that the capacity retention rate with respect to the initial capacity and the relative capacity with respect to that of Comparative Example 1 were further improved.

On the other hand, the capacity retention rate and the relative capacity with respect to the initial capacity in Comparative Examples 2 to 4 in which the covering part of the positive electrode active material particles was the compound (LCO, $NCM_{333}$, or $NMC_{622}$) having a space group of R-3m, Comparative Example 5 having LFP having a space group of Pnma, and Comparative Example 6 having LMO having a space group of Fd-3m were the same as or slightly lower than those in Comparative Example 1 in which the positive electrode active material particles were an LCO powder. It is considered that this is because the electrolytic solution was decomposed on the surface of the covering part by deintercalating and intercalating lithium from the covering part.

Examples 9 to 16 and Comparative Examples 7 and 8

Examples 9 to 16 and Comparative Examples 7 and 8 are different from Example 1 in that, when a positive electrode active material is prepared, a $LiNi_{1/3}Co_{1/3}Mn_{1/3}O_2$ ($NCM_{333}$) powder (a crystal structure: a space group of R-3m; an average particle size: 9.0 um) are used as an active material substance and the following materials are used as a covering material. It was confirmed that the obtained positive electrode active material contained positive electrode active material particles having a core part having a space group of R-3m and a covering part. In Comparative Example 7, an $NCM_{333}$ powder was not covered with a covering material and the $NCM_{333}$ powder was used as a positive electrode active material.

In Example 9, the $Li_{0.5}CoO_2$ fine powder prepared in (1) above was used.

In Example 10, the $Li_{0.3}CoO_2$ fine powder prepared in (2) above was used.

In Example 11, the $Li_{0.2}CoO_2$ fine powder prepared in (3) above was used.

In Example 12, the $CoO_2$ fine powder prepared in (4) above was used.

In Example 13, the CoO fine powder prepared in (5) above was used.

In Example 14, the $Co_2O_3$ fine powder prepared in (6) above was used.

In Example 15, the NiO fine powder prepared in (7) above was used.

In Example 16, the $Ni_{0.5}Co_{0.5}O_2$ fine powder prepared in (8) above was used.

In Comparative Example 8, the LCO fine powder prepared in (9) above was used.

The cycle characteristics of the lithium ion secondary batteries prepared in Examples 9 to 16 and Comparative Examples 7 and 8 were evaluated in the same manner as in Example 1. The results are shown in Table 2 below. The relative capacity was a relative amount with respect to that of Comparative Example 7.

TABLE 2

| | Core part | | Covering part | | | Cycle characteristics (1000 cycle) | |
|---|---|---|---|---|---|---|---|
| | Material | Space group | Material | Space group | Thickness (μm) | Capacity retention rate with respect to initial capacity (%) | Relative capacity with respect to that of Comparative Example 7 |
| Example 9 | $NCM_{333}$ | R-3m | $Li_{0.5}CoO_2$ | Fm-3m | 1.2 | 81 | 119.1 |
| Example 10 | $NCM_{333}$ | R-3m | $Li_{0.3}CoO_2$ | Fm-3m | 1.2 | 82 | 120.6 |
| Example 11 | $NCM_{333}$ | R-3m | $Li_{0.2}CoO_2$ | Fm-3m | 1.2 | 79 | 116.2 |
| Example 12 | $NCM_{333}$ | R-3m | $CoO_2$ | Fm-3m | 1.2 | 79 | 116.2 |
| Example 13 | $NCM_{333}$ | R-3m | CoO | Fm-3m | 1.2 | 77 | 113.2 |
| Example 14 | $NCM_{333}$ | R-3m | $Co_2O_3$ | Fm-3m | 1.2 | 76 | 111.8 |
| Example 15 | $NCM_{333}$ | R-3m | NiO | Fm-3m | 1.2 | 77 | 113.2 |
| Example 16 | $NCM_{333}$ | R-3m | $Ni_{0.5}Co_{0.5}O_2$ | Fm-3m | 1.2 | 81 | 119.1 |
| Comparative Example 7 | $NCM_{333}$ | R-3m | — | — | — | 68 | 100 |
| Comparative Example 8 | $NCM_{333}$ | R-3m | LCO | R-3m | 1.2 | 66 | 97.1 |

Even when the core part of the positive electrode active material particles is $NCM_{333}$ having a space group of R-3m, it was confirmed that, in Examples 9 to 16 in which the covering part was the compound having a space group of Fm-3m, the capacity retention rate with respect to the initial capacity and the relative capacity with respect to that of Comparative Example 7 were improved.

Examples 17 to 24 and Comparative Example 9

Examples 17 to 24 and Comparative Examples 9 are different from Example 1 in that, when a positive electrode active material is prepared, a $LiNi_{0.6}Co_{0.2}Mn_{0.2}O_2$ ($NMC_{622}$) powder (a crystal structure: a space group of R-3m; average particle size: 9.5 μm) is used as an active material substance and the following materials are used as a covering material. It was confirmed that the obtained positive electrode active material contained positive electrode active material particles having a core part having a space group of R-3m and a covering part. In Comparative Example 9, an $NCM_{622}$ powder was not covered with a covering material and the $NMC_{622}$ powder was used as a positive electrode active material.

In Example 17, the $Li_{0.5}CoO_2$ fine powder prepared in (1) above was used.

In Example 18, the $Li_{0.3}CoO_2$ fine powder prepared in (2) above was used.

In Example 19, the $Li_{0.2}CoO_2$ fine powder prepared in (3) above was used.

In Example 20, the $CoO_2$ fine powder prepared in (4) above was used.

In Example 21, the CoO fine powder prepared in (5) above was used.

In Example 22, the $Co_2O_3$ fine powder prepared in (6) above was used.

In Example 23, the NiO fine powder prepared in (7) above was used.

In Example 24, the $Ni_{0.5}Co_{0.5}O_2$ fine powder prepared in (8) above was used.

The cycle characteristics of the lithium ion secondary batteries prepared in Examples 17 to 24 and Comparative Example 9 were evaluated in the same manner as in Example 1. The results are shown in Table 3 below. The relative capacity was a relative amount with respect to that of Comparative Example 9.

TABLE 3

| | Core part | | Covering part | | | Cycle characteristics (1000 cycle) | |
|---|---|---|---|---|---|---|---|
| | Material | Space group | Material | Space group | Thickness (μm) | Capacity retention rate with respect to initial capacity (%) | Relative capacity with respect to that of Comparative Example 9 |
| Example 17 | $NMC_{622}$ | R-3m | $Li_{0.5}CoO_2$ | Fm-3m | 1.2 | 77 | 120.3 |
| Example 18 | $NMC_{622}$ | R-3m | $Li_{0.3}CoO_2$ | Fm-3m | 1.2 | 79 | 123.4 |
| Example 19 | $NMC_{622}$ | R-3m | $Li_{0.2}CoO_2$ | Fm-3m | 1.2 | 75 | 117.2 |
| Example 20 | $NMC_{622}$ | R-3m | $CoO_2$ | Fm-3m | 1.2 | 76 | 118.8 |
| Example 21 | $NMC_{622}$ | R-3m | CoO | Fm-3m | 1.2 | 73 | 114.1 |
| Example 22 | $NMC_{622}$ | R-3m | $Co_2O_3$ | Fm-3m | 1.2 | 71 | 110.9 |

TABLE 3-continued

| | Core part | | Covering part | | Cycle characteristics (1000 cycle) | |
|---|---|---|---|---|---|---|
| | | | | | Capacity retention rate with respect to initial capacity (%) | Relative capacity with respect to that of Comparative Example 9 |
| | Material | Space group | Material | Space group | Thickness (μm) | |
| Example 23 | $NMC_{622}$ | R-3m | NiO | Fm-3m | 1.2 | 74 | 115.6 |
| Example 24 | $NMC_{622}$ | R-3m | $Ni_{0.5}Co_{0.5}O_2$ | Fm-3m | 1.2 | 76 | 118.8 |
| Comparative Example 9 | $NMC_{622}$ | R-3m | — | — | — | 64 | 100 |

Even when the core part is $NCM_{622}$ having a space group of R-3m, it was confirmed that, in Examples 17 to 24 in which the covering part was the compound having a space group of Fm-3m, the capacity retention rate with respect to the initial capacity and the relative capacity with respect to that of Comparative Example 9 were improved.

Comparative Examples 10 to 13

Comparative Examples 10 to 13 and Example 1 differ in that, when a positive electrode active material is prepared, a lithium iron phosphate (LFP) powder (a crystal structure: a space group of Pnma; an average particle size: 1.5 μm) is used as an active material substance and the following materials are used as a covering material. It was confirmed that the obtained positive electrode active material contained positive electrode active material particles having a core part having a space group of Pnma and a covering part. In Comparative Example 10, an LFP powder was not covered with a covering material and the LFP powder was used as a positive electrode active material.

In Comparative Example 11, the CoO fine powder prepared in (5) above was used.

In Comparative Example 12, the $NCM_{333}$ fine powder prepared in (10) above was used.

In Comparative Example 13, the $CoO_2$ fine powder prepared in (4) above was used.

The cycle characteristics of the lithium ion secondary batteries prepared in Comparative Examples 10 to 13 were evaluated in the same manner as in Example 1. The results are shown in Table 4 below. The relative capacity was a relative amount with respect to that of Comparative Example 10.

TABLE 4

| | Core part | | Covering part | | Cycle characteristics (1000 cycle) | |
|---|---|---|---|---|---|---|
| | | | | | Capacity retention rate with respect to initial capacity (%) | Relative capacity with respect to that of Comparative Example 10 |
| | Material | Space group | Material | Space group | Thickness (μm) | |
| Comparative Example 10 | LFP | Pnma | — | — | — | 75 | 100 |
| Comparative Example 11 | LFP | Pnma | LCO | R-3m | 1.2 | 73 | 97.3 |
| Comparative Example 12 | LFP | Pnma | $NCM_{333}$ | R-3m | 1.2 | 74 | 98.7 |
| Comparative Example 13 | LFP | Pnma | $CoO_2$ | Fm-3m | 1.2 | 70 | 93.3 |

When the space group of the core part of the positive electrode active material particles is Pnma, the capacity retention rate with respect to the initial capacity and the relative capacity in all Comparative Example 11 in which the covering part is LCO having a space group of R-3m, Comparative Example 12 having $NCM_{333}$, and Comparative Example 13 in which the covering part is $CoO_2$ having a space group of Fm-3m were the same as or slight lower than that in Comparative Example 10 in which the positive electrode active material is an LFP powder.

Comparative Examples 14 to 17

Comparative Examples 14 to 17 and Example 1 differ in that, when a positive electrode active material is prepared, a $LiMn_2O_4$ (LMO) powder (a crystal structure: a space group of Fd-3m; an average particle size: 9.0 μm) is used as an active material substance and the following materials are used as a covering material. It was confirmed that the obtained positive electrode active material contained positive electrode active material particles having a core part having a space group of Fd-3m and a covering part. In Comparative Example 14, the LMO powder was not covered with a covering material and the LMO powder was used as a positive electrode active material.

In Comparative Example 15, the LCO fine powder prepared in (9) above was used.

In Comparative Example 16, the LFP fine powder prepared in (12) above was used.

In Comparative Example 17, the $CoO_2$ fine powder prepared in (4) above was used.

The cycle characteristics of the lithium ion secondary batteries prepared in Comparative Examples 14 to 17 were evaluated in the same manner as in Example 1. The results are shown in Table 5 below. The relative capacity was a relative amount with respect to that of Comparative Example 14.

than those in Comparative Example 14 in which the positive electrode active material is an LMO powder.

Examples 25 to 34

Lithium ion secondary batteries were prepared in the same as in Example 2 except for a mixing ratio between a $LiCoO_2$ (LCO) powder (a crystal structure: a space group of R-3m; an average particle size: 10.5 μm) and the $Li_{0.3}CoO_2$ fine powder prepared in (2) above when a positive electrode active material is prepared and the conditions for a ball mill in which the obtained mixture is dry-pulverized and mixed.

TABLE 5

| | Core part | | Covering part | | | Cycle characteristics (1000 cycle) | |
|---|---|---|---|---|---|---|---|
| | Material | Space group | Material | Space group | Thickness (μm) | Capacity retention rate with respect to initial capacity (%) | Relative capacity with respect to that of Comparative Example 14 |
| Comparative Example 14 | LMO | Fd-3m | — | — | — | 62 | 100 |
| Comparative Example 15 | LMO | Fd-3m | LCO | R-3m | 1.2 | 64 | 103.2 |
| Comparative Example 16 | LMO | Fd-3m | LFP | Puma | 1.2 | 61 | 98.4 |
| Comparative Example 17 | LMO | Fd-4m | $CoO_2$ | Fm-3m | 1.2 | 61 | 98.4 |

When the space group of the core part of the positive electrode active material particles was Fd-3m or Fd-4m, the capacity retention rate with respect to the initial capacity and the relative capacity in all Comparative Example 15 in which the covering part is LCO having a space group of R-3m, Comparative Example 16 in which the covering part is LFP having a space group of Pnma, and Comparative Example 17 in which the covering part is $CoO_2$ having a space group of Fm-3m were the same as or slightly lower The cycle characteristics of the lithium ion secondary batteries prepared in Examples 25 to 34 were evaluated in the same manner as in Example 1. The results are shown in Table 6 below. The relative capacity was a relative capacity with respect to that of Comparative Example 1.

TABLE 6

| | Core part | | Covering part | | | Cycle characteristics (1000 cycle) | |
|---|---|---|---|---|---|---|---|
| | Material | Space group | Material | Space group | Thickness (μm) | Capacity retention rate with respect to initial capacity (%) | Relative capacity with respect to that of Comparative Example 1 |
| Example 2 | LCO | R-3m | $Li_{0.3}CoO_2$ | Fm-3m | 1.2 | 85 | 121.4 |
| Comparative Example 1 | LCO | R-3m | — | — | — | 70 | 100 |
| Example 25 | LCO | R-3m | $Li_{0.3}CoO_2$ | Fm-3m | 1.5 | 84 | 120.0 |
| Example 26 | LCO | R-3m | $Li_{0.3}CoO_2$ | Fm-3m | 1.6 | 77 | 110.0 |
| Example 27 | LCO | R-3m | $Li_{0.3}CoO_2$ | Fm-3m | 1.8 | 76 | 108.6 |
| Example 28 | LCO | R-3m | $Li_{0.3}CoO_2$ | Fm-3m | 1.1 | 83 | 118.6 |
| Example 29 | LCO | R-3m | $Li_{0.3}CoO_2$ | Fm-3m | 1.0 | 88 | 125.7 |
| Example 31 | LCO | R-3m | $Li_{0.3}CoO_2$ | Fm-3m | 0.5 | 89 | 127.1 |
| Example 32 | LCO | R-3m | $Li_{0.3}CoO_2$ | Fm-3m | 0.2 | 89 | 127.1 |
| Example 33 | LCO | R-3m | $Li_{0.3}CoO_2$ | Fm-3m | 0.1 | 83 | 118.6 |
| Example 34 | LCO | R-3m | $Li_{0.3}CoO_2$ | Fm-3m | 0.06 | 75 | 107.1 |

When a thickness of the covering part was 0.1 to 1.5 μm, the capacity retention rate and the relative capacity were improved as compared with Comparative Example 1. Particularly, when the thickness of the covering part was 0.2 to 1.0 μm, a particularly high capacity retention rate and relative capacity were exhibited. On the other hand, when the thickness of the covering part was thinner than 0.1 μm and when the thickness of the covering part was thicker than 1.5 the capacity retention rate and the relative capacity were slightly improved as compared with Comparative Example 1.

EXPLANATION OF REFERENCES

10 Separator
20 Positive electrode
22 Positive electrode current collector
24 Positive electrode active material layer
25 Positive electrode active material particle
26 Core part
27 Covering part
30 Negative electrode
32 Negative electrode current collector
34 Negative electrode active material layer
40 Power generation element
50 Exterior body
52 Metal foil
54 Resin inlayer
60, 62 Terminal
100 Lithium ion secondary battery

What is claimed is:

1. An electrode, comprising:
an active material layer including an active material, a conductive assistant, and a binder,
wherein the active material contains active material particles containing a lithium transition metal oxide as a main component, and
the active material particles each include a core part having a space group of R-3m and a covering part having a space group of Fm-3m configured to cover at least part of an outer circumferential portion of the core part,
wherein, in the active material particle, the core part contains a compound represented by a general formula (1) and the covering part contains a compound represented by a general formula (2), $$Li_aM1O_2 \qquad (1),$$

where M1 in the general formula (1) represents at least one transition metal selected from the group consisting of Co, Ni, and Mn and a in the general formula (1) represents a number in which $0 \leq a \leq 1.2$ is satisfied, $$Li_{1-x}M2_yO_z \qquad (2),$$

where M2 in the general formula (2) represents at least one transition metal selected from the group consisting of Co, Ni, and Mn and x, y, and z in the general formula (2) are numbers in which $0.5 \leq x \leq 1$, $1 \leq y \leq 2$, and $1 \leq z \leq 3$ are satisfied.

2. The electrode according to claim 1, wherein the compound represented by the general formula (1) and the compound represented by the general formula (2) contain at least one transition metal which is common to both.

3. The electrode according to claim 1, wherein the thickness of the covering part is within 0.1 μm or more and 1.5 μm or less.

4. The electrode according to claim 1, wherein the compound represented by the general formula (1) is the lithium composite metal oxide containing Co.

5. A lithium ion secondary battery, comprising:
the electrode according to claim 1.

* * * * *